United States Patent
Oe et al.

(10) Patent No.: US 8,166,242 B2
(45) Date of Patent: Apr. 24, 2012

(54) DISTRIBUTED DISK CACHE SYSTEM AND DISTRIBUTED DISK CACHE METHOD

(75) Inventors: Kazuichi Oe, Kawasaki (JP); Tatsuo Kumano, Kawasaki (JP); Yasuo Noguchi, Kawasaki (JP); Yoshihiro Tsuchiya, Kawasaki (JP); Kazutaka Ogihara, Kawasaki (JP); Masahisa Tamura, Kawasaki (JP); Tetsutaro Maruyama, Kawasaki (JP); Takashi Watanabe, Kawasaki (JP); Minoru Kamosida, Kawasaki (JP); Shigeyuki Miyamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 424 days.

(21) Appl. No.: 12/471,940

(22) Filed: May 26, 2009

(65) Prior Publication Data

US 2009/0319724 A1    Dec. 24, 2009

(30) Foreign Application Priority Data

Jun. 18, 2008  (JP) ................................ 2008-158591

(51) Int. Cl.
G06F 13/00 (2006.01)
G06F 12/00 (2006.01)
G06F 15/167 (2006.01)

(52) U.S. Cl. ...................................... 711/113; 709/226

(58) Field of Classification Search .................. 709/226; 711/113
See application file for complete search history.

(56) References Cited

U.S. PATENT DOCUMENTS

| | | | |
|---|---|---|---|
| 2002/0073405 A1* | 6/2002 | Chilimbi | 717/151 |
| 2002/0169901 A1 | 11/2002 | Fujibayashi et al. | |
| 2004/0261062 A1* | 12/2004 | Chilimbi | 717/126 |
| 2008/0172489 A1* | 7/2008 | Zhu et al. | 709/226 |
| 2008/0177975 A1* | 7/2008 | Kawamura | 711/173 |

FOREIGN PATENT DOCUMENTS

| | | |
|---|---|---|
| JP | A 2001-134522 | 5/2001 |
| JP | A 2002-333956 | 11/2002 |
| JP | 2005-141575 | 6/2005 |
| WO | WO 00/22526 | 4/2000 |

* cited by examiner

*Primary Examiner* — Hoai V Ho
*Assistant Examiner* — Min Huang
(74) *Attorney, Agent, or Firm* — Greer, Burns & Crain, Ltd.

(57) ABSTRACT

According to an aspect of the embodiment, a packet analyzing apparatus monitors a concentration level of input and output access from an access apparatus to a disk device, specifies a data area to which the concentration level of input and output access exceeds a first threshold, and instructs a storage server to cache the data area. The packet analyzing apparatus monitors a concentration level of input and output access to a data area to which the data area is cached, and, when the concentration level of input and output access is below a second threshold, instructs the storage server to release the caching.

4 Claims, 11 Drawing Sheets

1 Gbyte SLICE/SEGMENT — 110

- 111 DEVICE META-INFORMATION
- 112 SLICE ACCESS COUNTER
- 113 SLICE 1 META-INFORMATION
- 114 SLICE 1 DATA

FIG.3B

| LOGICAL VOLUME ID | SEGMENT ID | read/write | SIZE | ... |
|---|---|---|---|---|
| A | SA | read | 64M | |
| B | SB | write | 256M | |
| C | SC | write | 16M | |
| ⋮ | | | | |

| LOGICAL VOLUME ID | SEGMENT ID | LOGIC CONTROL | CACHE CAPACITY |
|---|---|---|---|
| A | SA | EVERY 10 MIN | 256M |
| B | SB | EVERY 12 HR | 1G |
| C | SC | NOT PERFORMED | 0 |
| ⋮ | | | |

DISTRIBUTED DISK CACHE SYSTEM AND DISTRIBUTED DISK CACHE METHOD

CROSS-REFERENCE TO RELATED APPLICATIONS

This application is based upon and claims the benefit of priority of the prior Japanese Patent Application No. 2008-158591, filed on Jun. 18, 2008, the entire contents of which are incorporated herein by reference.

FIELD

The embodiments discussed herein are related to a distributed disk cache system and a distributed disk cache method.

BACKGROUND

There is a computer system having a configuration in which a computer is connected to a plurality of disk devices via a network. In this computer system, performance of access to data is improved by providing a cache.

For example, it is known, in a computer system in which a computer and a storage device is connected by a bus, to provide a cache in an input and output unit of the computer, to count a frequency of access to a disk device, and to cache data according to the frequency (Japanese Laid-Open Patent Publication No. 2001-134522).

Further, it is known, in a computer system in which a host computer and a shared memory are connected by a network, to provide a cache connected to other networks, to monitor an access state in a disk control device, and to provide an administrating person with such information that recommends shift of data or the like concerning a logical volume which is frequently accessed among disk devices (Japanese Laid-Open Patent Publication No. 2002-333956).

SUMMARY

According to an aspect of the embodiment, a distributed disk cache system includes a storage, a cache server, an access apparatus, and a monitoring apparatus. The storage is divided into a plurality of data areas. The cache server caches one or a plurality of data areas of the storage. The access apparatus accesses the storage or the cache server via a network. The monitoring apparatus is connected to the network, monitors access from the access apparatus to the storage via the network, and caches a data area to the cache server. The data area has a concentration level of the access exceeding a first threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

We examined access to a storage in a computer system in which a computer and a storage including a plurality of RAID (Redundant Arrays of Inexpensive Disks) devices were connected via a network, and a virtual (or logical) volumes are provided for the computer. As a result, we found that, in this computer system, there is a tendency that, depending on a configuration of a file system and an access pattern of an application, access concentrates on a storage area of a specific RAID device (hereinafter referred to as "hot spot") in a certain time zone. A load such as the hot spot becomes a bottleneck in the improvement of the access performance.

Figure 10:
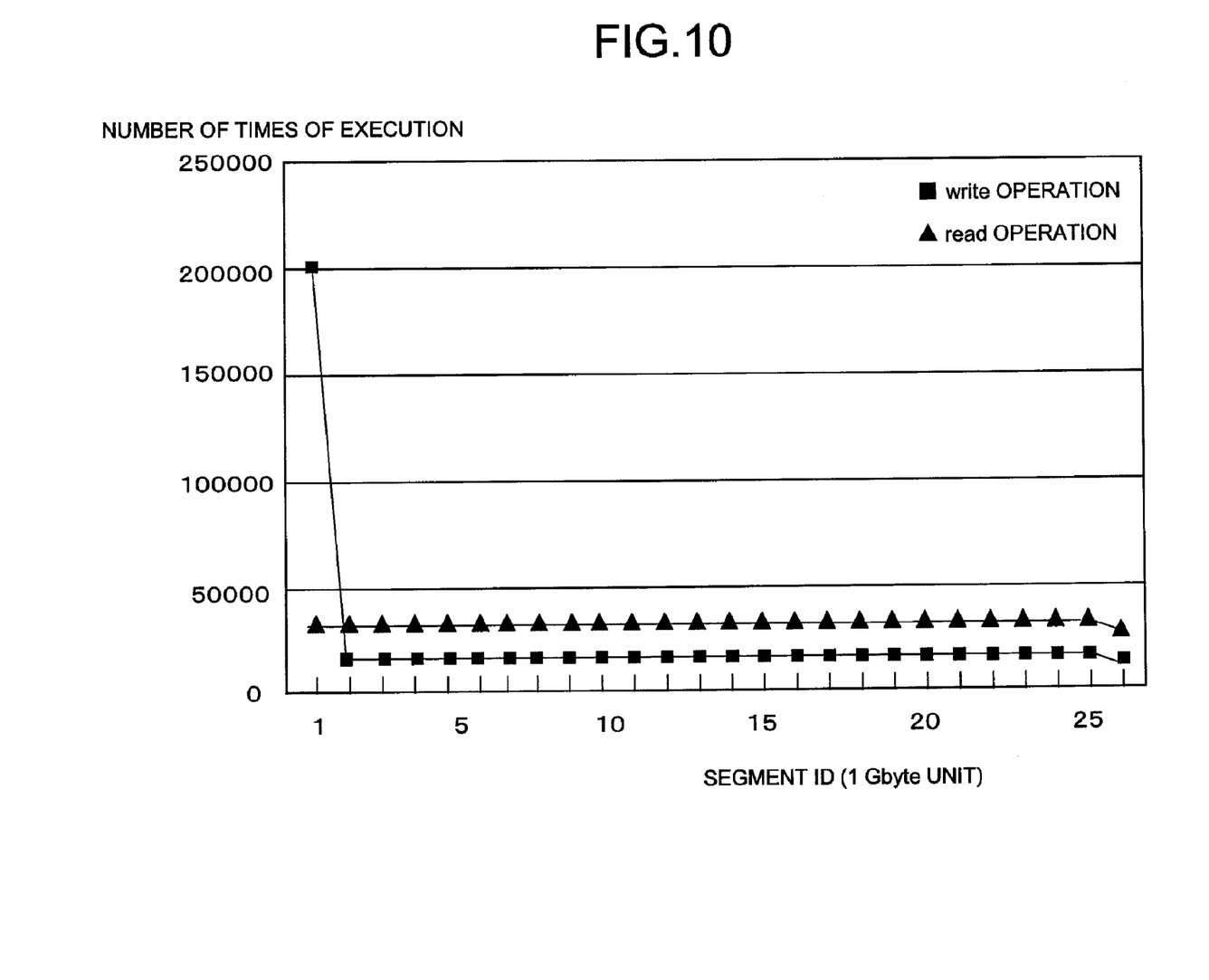
FIG. 10 is a graph of a packet capture result in a load state of a network storage as a background of the present invention.
Figure 11:
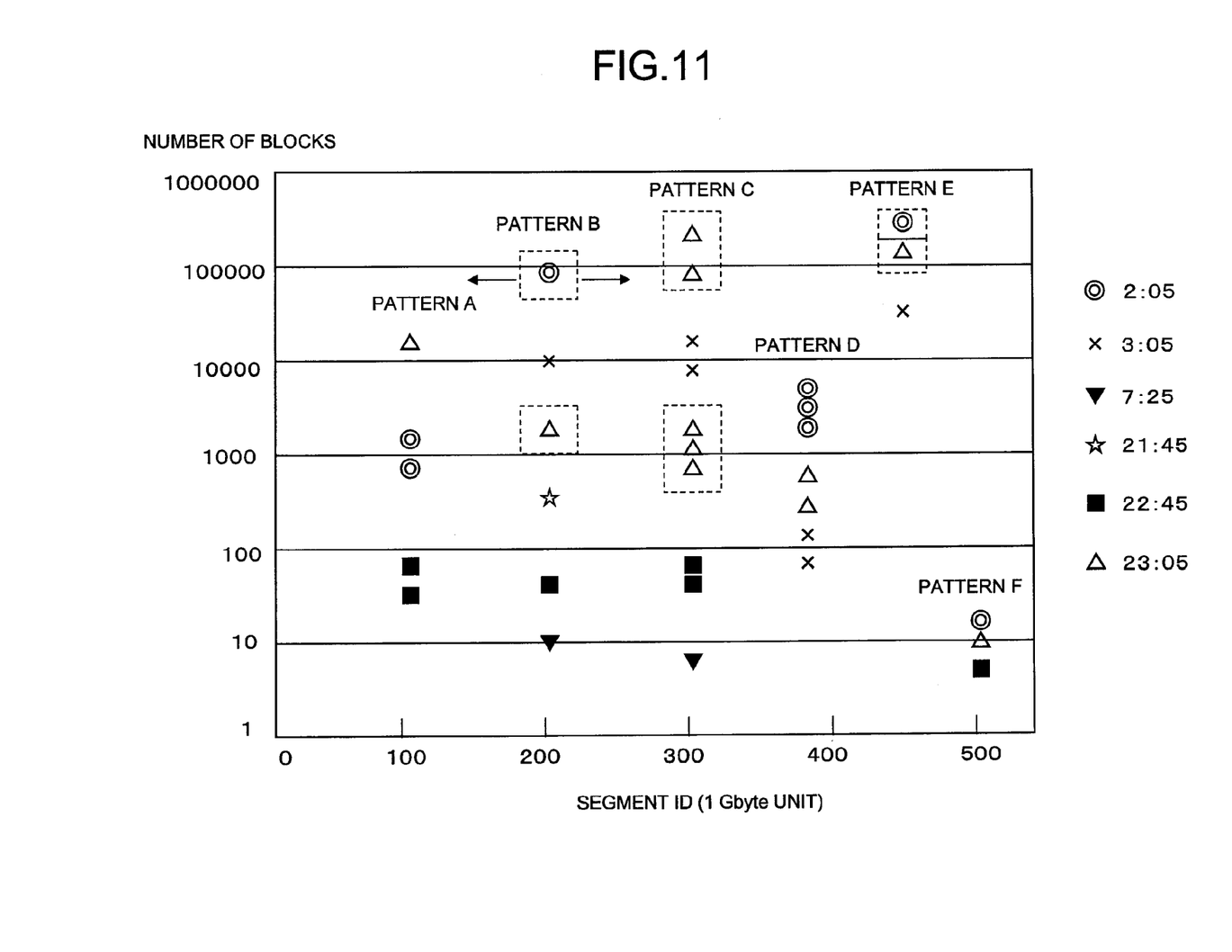
FIG. 11 is a diagram of an overview of an I/O access state in each time zone distribution of the network storage as the background of the present invention.

FIGS. 10 and 11 are graphs for explaining the background of the present invention examined by us.

FIG. 10 is a graph of a result of packet capture in a network storage system (hereinafter referred to as "network storage"). In FIG. 10, the abscissa indicates a segment ID (1 gigabyte unit) of a disk device, and the ordinate indicates a number of times of a write operation or read operation with respect to a corresponding segment ID (a number of times of access). A segment is a division unit of a logical volume, and a size of the segment is 1 gigabyte in FIG. 10 (the same applies to FIG. 11).

FIG. 10 illustrates a result of an access with a condition in which access (I/O access) to a disk device of a storage is executed in a journal mount state in an ext3 file system. As it is seen from FIG. 10, nearly two hundred thousand times of write access concentrates on a segment ID "1", or a first 1 gigabyte of a logical volume. In other segments, access is equal to or smaller than fifty thousand times.

This example indicates that the concentration of access to the disk device depends on a configuration of a file system. Some file system has its management data (for example, metadata etc.) in a top storage area. In the example in FIG. 10 illustrates an example of a state in which access concentrates on this specific top storage area.

FIG. 11 is a graph of a state of I/O access to a network storage at every time zone. In FIG. 11, the abscissa indicates a segment ID (1 gigabyte unit) of a disk device, and the ordinate indicates a number of accessed blocks together with a time zone of the access. For example, an access pattern A indicates that a change in a number of blocks accessed in each of time zones (an access pattern) concerning an area with a segment ID "100".

FIG. 11 illustrates a state of access of an access with a condition in which a certain one application is executed and a load state in a network storage having a capacity of 500 gigabyte is monitored. The monitoring is performed by generating a copy of network access of an access apparatus using a network switch, and by transferring the copy to a packet analyzing apparatus.

As it is seen from FIG. 11, I/O access concentrates on specific and partial areas in specific time zones. This is because access concentrates on the specific areas which is used by an operating application.

In this specification, an area in which I/O access concentrates (indicated by a dotted line frame) as illustrated in FIG. 11 is referred to as "hot spot". In patterns A to F of temporal changes of access illustrated in FIG. 11, for example, areas which are indicated by triangle signs or double circle signs in each of the patterns B, C, and E are hot spots.

As explained above, according to our examination, the concentration of access depends on various conditions of a file system, an application, and the like. Various forms of concentration are present according to the conditions. The hot spot is not fixed and moves as indicated by arrows in FIG. 11. Moving time of the hot spot is not fixed either. For example, in some case, the hot spot does not move in a unit of one day but moves in a unit of one week. We suppose that the performance of access could be further improved when data was efficiently cached by using such forms of the concentration of access.

According to a distributed disk cache system and a distributed disk cache method described bellow, the data area in which the concentration level of access from the access apparatus to the storage exceeds the first threshold is cached to the cache server. Consequently, it is possible to dynamically extract a data area regarded as a hot spot in which a concentration level of access exceeds a threshold, and cache the data area without the intervention of an operator. Therefore, even when concentration of access occurs in various forms depending on various conditions of a file system, an application, and the like, or even when a hot spot fluctuates, it is possible to extract and cache the hot spot. As a result, it is possible to efficiently cache data and improve performance of access to a disk device.

Preferred embodiments of the present invention will be explained with reference to accompanying drawings.

Figure 1:
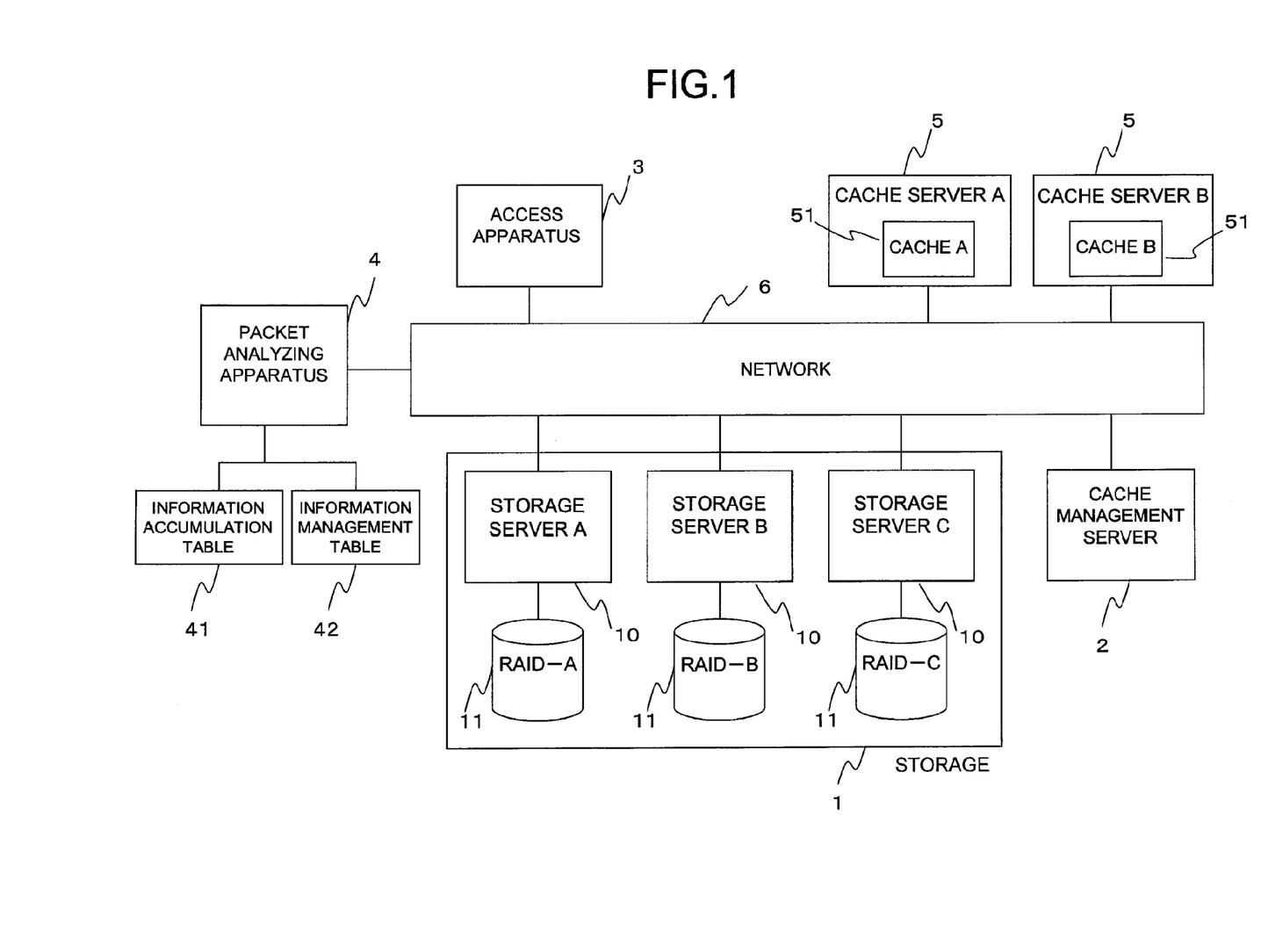
FIG. 1 is a diagram of a structure of a distributed disk cache system according to an embodiment of the present invention.
Figure 2:
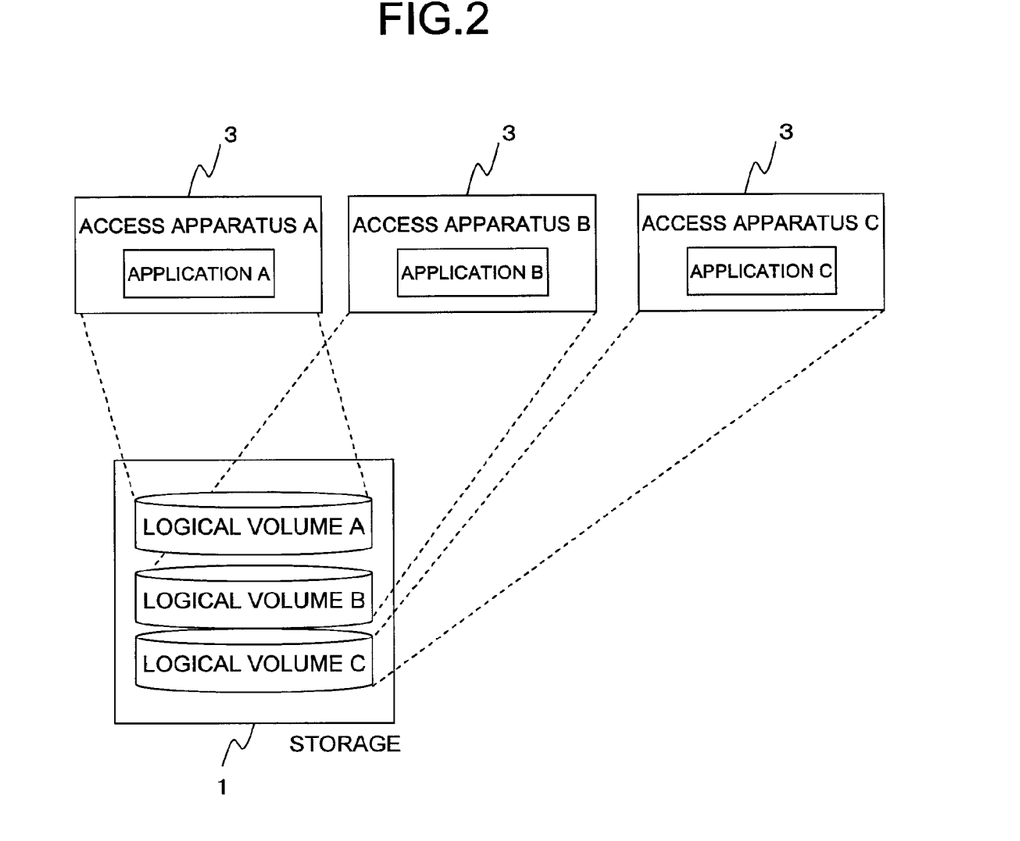
FIG. 2 is a diagram of the structure of logical volumes of a storage.

FIG. 1 is a diagram of a structure of a distributed disk cache system. FIG. 2 is a diagram of the structure of logical volumes of a storage illustrated in FIG. 1.

The distributed disk cache system includes a storage 1, a cache management server 2, an access apparatus 3, a packet analyzing apparatus 4, one or a plurality of cache servers 5, and a network 6 which connects the above apparatuses.

The storage 1 is a storage which included a plurality of storage servers (storage server machines) 10 and a plurality of disk devices 11. Each of the storage servers 10 includes at least one disk device 11. The storage servers 10 are connected to one another via the network 6. The disk device 11 is a large-capacity storage device which includes a magnetic disk such as a RAID. As explained later, the storage 1 is virtually (or logically) divided into a plurality of data areas. As explained later, one data area includes, for example, segments included in a logical volume.

In the storage 1, in response to a data reading request or a data writing request from the access apparatus 3, the storage server 10 controls the disk device 11 corresponding to the request. In other words, the storage server 10 reads the requested data from or writes the requested data to the disk device 11 corresponding to the request.

When the a plurality of storage servers 10 are distinguished from one another, the storage servers 10 are represented with alphabets affixed to the reference numeral in such a manner as storage server 10A. The same applies to the disk devices 11, the cache server 5, and a cache 51. The storage server 10A is represented as "storage server A" in the figures. The disk device 11A is represented as "RAID-A" in the figures.

The cache server 5 is a server (a server apparatus) which includes the cache 51, and cashes one or a plurality of data areas (or cashes the data stored in the area) of the storage 1 to the cache 51. The cache 51 is a storage device, for example, a semiconductor memory or a disk device, each of which has a sufficiently higher speed than the disk devices 11.

A plurality of cache servers 5A and 5B are connected to the network 6 as the cache server 5. The cache server 5 acquires an area for caching segments of the disk devices 11 (cache areas) in the cache 51 in response to an assigning or acquiring request of cache areas from the cache management server 2. In this example, a data area to be cached is a segment detected as the hot spot, for example.

In this example, the cache server 5A is a primary cache server, and the cache server 5B is a secondary cache server. This makes it possible to mirror and duplex the cache server 5. Further, the primary cache 51A may be a high-speed semiconductor memory, and the secondary cache 51B may be a high-speed RAID. It is possible to improve reliability of the cache server by using the redundant structure above described.

The cache management server 2 is a server (a server apparatus) which manages the cache server 5. Specifically, the cache management server 2 manages assigning and releasing of a storage area (a cache area) in the cache 51 of the cache server 5. For example, the cache management server 2 performs, in response to an assigning request for a cache area from the storage server 10, the requested assigning of the cache area. Further, the cache management server 2 performs, in response to an releasing request for a cache area from the storage server 10, the releasing of the cache requested to be released.

The access apparatus 3 is a computer (a client apparatus) in which a client executes an application (an application program). For the execution of the application, the access apparatus 3 accesses the storage 1 and the cache server 5 via the network 6. Actually, the access apparatus 3 includes a plurality of access apparatuses 3, as illustrated in FIG. 2. When the a plurality of access apparatuses 3 are distinguished from one another, for example, the access apparatuses 3 are represented with alphabets affixed thereto in such a manner as access apparatus A.

In FIG. 2, each of the access apparatuses 3 includes at least one application. For example, the application included in the access apparatus A is represented as application A. In the storage 1, a logical volume, which is a virtual unit storage device, is assigned to each of applications. For example, the logical volume assigned to the application A is represented as logical volume A. Actually, one logical volume is formed by connecting a part of areas of a plurality of physical disks of a plurality of storages 1.

Since the logical volume is assigned to each of the applications in this way, the packet analyzing apparatus 4 monitors access with the logical volume as a unit. In addition, the packet analyzing apparatus 4 can control necessity of caching based on a result of the monitoring with a segment included in the logical volume as a unit, for example.

The packet analyzing apparatus 4 is connected to the network 6 by a network switch, for example. The packet analyzing apparatus 4 is a monitoring apparatus which monitors a transmission and reception packet of the access apparatus 3, which is connected to the network 6 by the network switch. The packet analyzing apparatus 4 monitors access from the access apparatus 3 to the storage 1 via the network 6, and caches (copies or stores) a data area (for example, a segment) in which a concentration level of access exceeds a first threshold in the cache server 5, for example. The packet analyzing apparatus 4 includes, for example, a communication interface receiving a packet to be monitored, a buffer area in which the received packet is stored, a CPU (Central Processing Unit) that executes packet analysis processing and statistical processing, and a memory.

As a concentration level of access, various parameters can be used. For example, a number of times of access per data area, a number of accessed blocks per data area, and a number of packets to be read or written per data area, in a unit time are used. The first threshold is decided according to a parameter used as the concentration level of access.

The first threshold is a value for deciding a data area which should be cached in the cache server 5, and is a value for defining the hot spot. The first threshold can be set by, for example, analyzing an access state in the past, and is set in advance. When the number of packets is used as the concentration level of access, the first threshold is set to "500", for example, as explained later in detail.

The packet analyzing apparatus 4 monitors access from the access apparatus 3 to the cache server 5 via the network 6. And, based on a result of the monitoring, the packet analyzing apparatus 4 releases the caching of the cached data area in the cache server 5, when the concentration level of access to the data area cached in the cache server 5 is below a second threshold.

The second threshold is a value for deciding releasing of the data area cached in the cache server 5 (releasing of the caching), and is a value for making that the data area is not the hot spot. The second threshold can be set by, for example, analyzing an access state in the past, and is set in advance. When the number of packets is used as the concentration level of access, the second threshold is set to "700", for example, as explained later in detail.

The packet analyzing apparatus 4 includes an information accumulation table 41 and an information management table 42. The information accumulation table 41 and the information management table 42 are provided in a memory included in the packet analyzing apparatus 4, and created by the packet analyzing apparatus 4.

The packet analyzing apparatus 4 collects transmission and reception packets of the access apparatus 3 through the monitoring, performs statistical processing to the collected packets as a result of monitoring, and generates statistical information. The statistical processing is a processing for, as illustrated in FIG. 11, calculating the number of blocks accessed for each of segment IDs at each time zone or unit time, both of which are set in advance, for example. The statistical information is stored in the information accumulation table 41. The information accumulation table 41 is explained later with reference to FIG. 3B. The information accumulation table 41 is sequentially updated according to the statistical information.

Further, the packet analyzing apparatus 4 specifies data areas which become the hot spots based on the statistical information of the information accumulation table 41, and sets a cache control state for each of the data areas in the information management table 42. The information management table 42 is explained later with reference to FIG. 3C. The information management table 42 is sequentially updated according to the cache control state.

Specifically, the packet analyzing apparatus 4 monitors whether a concentration level of access to the storage 1 exceeds the first threshold, based on the information accumulation table 41 in which the statistical information is stored. The packet analyzing apparatus 4 detects a hot spot based on a result of the monitoring, and stores information concerning the detected hot spot in the information management table 42. The packet analyzing apparatus 4 caches a data area which is the hot spot in the cache server 5 based on the information management table 42.

The packet analyzing apparatus 4 monitors, based on the information accumulation table 41, whether a concentration level of access to the cached data area is below the second threshold. The packet analyzing apparatus 4 detects, based on a result of the monitoring, a hot spot that should be released and deletes information concerning the detected hot spot from the information management table 42. The packet analyzing apparatus 4 deletes or releases the data area, which is not the hot spot any more, from the cache server 5, based on the information management table 42.

The network 6 includes a gigabit Ethernet (IEEE802.3z standard, Ethernet is a registered trademark), for example. The packet analyzing apparatus 4 monitors a packet of the storage server 10 from a network apparatus such as a gigabit Ethernet switch included in the network 6. Specifically, the network 6 includes a mirroring port for monitoring a communication port with the access apparatus 3 in the network apparatus. The packet analyzing apparatus 4 analyzes the packet when a communication interface thereof is connected to the mirroring port.

Figure 3A:
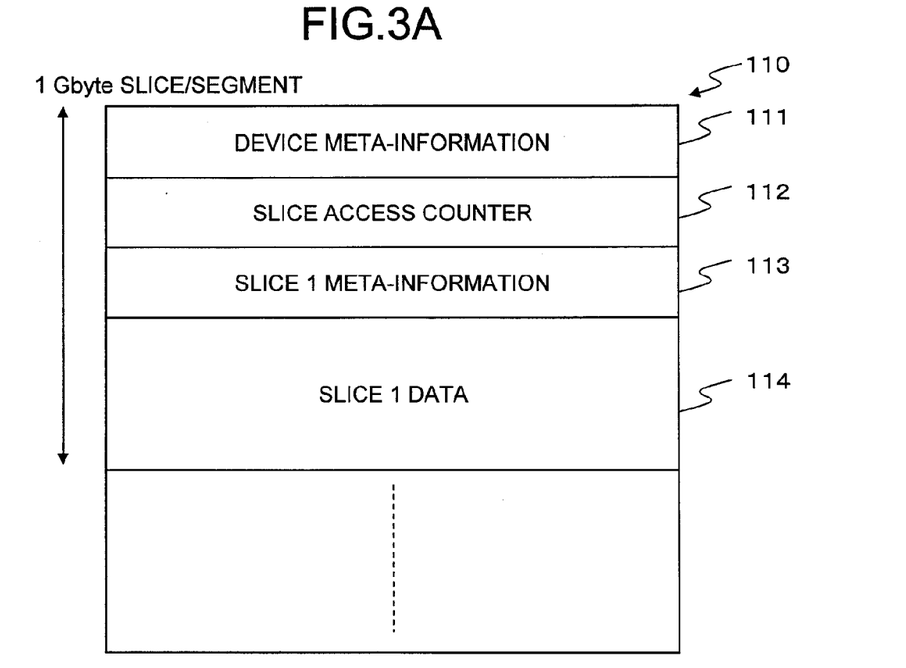
FIGS. 3A to 3C are diagrams of disk data structures of a disk device, an information accumulation table, and an information management table.
Figure 3B:
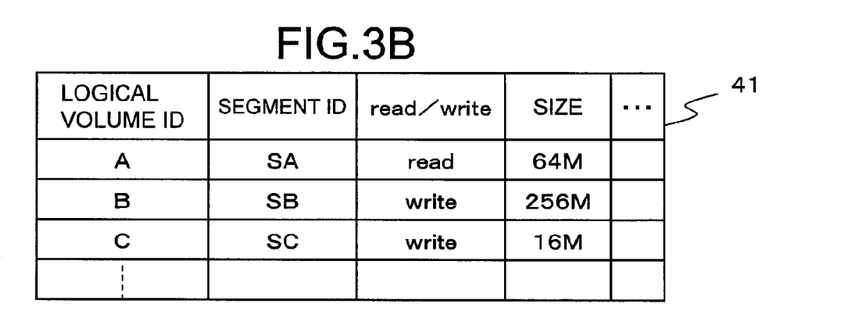
Figure 3C:
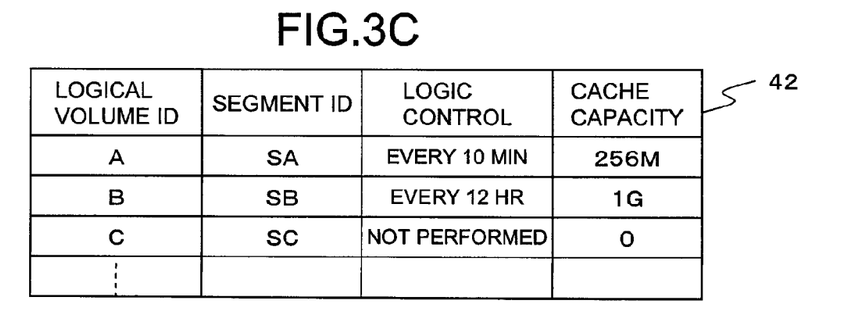

FIG. 3A is a diagram of a disk data structure of the disk device 11. FIG. 3B is the information accumulation table 41 in which the packet analyzing apparatus 4 collects statistics. FIG. 3C is the information management table 42 managed by the packet analyzing apparatus 4.

In the disk device 11, as illustrated in FIG. 3A, a data area is managed for each slice (or each segment) 110. One disk device 11 includes a plurality of slices. The number of slices in the disk device 11 depends on a capacity of the disk device 11.

One slice 110 is a unit of data management, and is set to, for example, 1 gigabyte. One slice 110 includes, for example, device meta-information 111, a slice access counter 112, slice meta-information 113, and slice data 114.

The device meta-information 111 is whole information of the disk device 11, and is a storage area storing the whole information. The slice access counter 112 is the number of times of access to the slice 110, and is a storage area storing the number of times of access. The slice meta-information 113 is data management information, and is a storage area storing the data management information. The slice data 114 is data stored in the slice 110, and is a storage area storing the data.

The data management information includes cache control information, an IP address of the cache server 5, and cache area information. The cache control information indicates that caching for the slice 110 is valid or invalid. When the caching is valid, this indicates that the slice 110 is cached to the cache server 5. When the caching is invalid, this indicates that the slice 110 is not cached to the cache server 5. When the caching is valid, the IP address of the cache server 5, and the cache area information are stored. The cache area information is, for example, an address of a cache area in the cache server 5.

When the slice meta-information is referred to as "slice x meta-information", "x" is an integer, and is a number representing order of slices when numbers of slices are assigned in order from a top logical address. For example, in FIG. 3A, the slice meta-information 113 of a "slice 1" is represented as "slice 1 meta-information". Slice meta-information with x equal to or larger than 2 is omitted in the figures. The same applies to slice x data. The slice x meta-information manages information in a relevant data area. A value of x in the slice x meta-information and the slice x data depends on a capacity of the disk device 11.

As illustrated in FIG. 3B, the information accumulation table 41 stores, for each of the segments, information such as a logical volume, a type of access, and a size. The segment is a data area as a target of the access. Therefore, in this example, presence or absence of access is managed with the segment as a unit. The logical volume is a data area to which the segment belongs. The logical volume is represented by using an ID of the logical volume. The segment is represented by using an ID of the segment. The type of access is read processing (read) or write processing (write). The size is the size of data accessed by the access.

For example, concerning a segment with an ID "SA" belonging to a logical volume with an ID "A", "read processing" for data having a size of "64M" bytes is performed. In this case, as illustrated in FIG. 3B, the logical volume ID "A", the segment ID "SA", the access type "read", and the size "64M (bytes)" are recorded together with time of the processing. The packet analyzing apparatus 4 analyzes these kinds of information, and detects a hot spot. The information accumulation table 41 stores, for each of the segments, information for detecting a hot spot (statistical information).

In this example, for simplification of explanation, the segment is explained as a unit data area in units of management of presence or absence of access and caching, for example. However, the segment is as large as 1 gigabyte. Thus, actually, a data area smaller than the segment is used as a unit data area in management of presence or absence of access and caching, for example. The size of the unit data area is set to, for example, 64 kilobytes. In this example, the storage 1 is divided into a plurality of unit data areas, each having the size of 64 kilobytes, and managed. Actually, the information accumulation table 41 stores identification information of the unit data areas as well and stores, for each of the unit data areas, an access type, a size, processing time, and the like. In the information management table 42 explained later, as in the information accumulation table 41, actually, identification information of unit data areas is also stored, and necessary information is stored for each of the unit data areas. Since the unit data areas are formed as small areas in this way, it is possible to reduce overhead due to caching.

As illustrated in FIG. 3C, the information management table 42 stores, for each of the segments, a logical volume, logic control, a cache capacity, and the like. The segment is a data area detected as a hot spot by the packet analyzing apparatus 4. The logical volume is a data area to which the segment belongs. The logical volume is described by using an ID of the logical volume. The segment is described by using an ID of the segment. The logic control is information for checking whether the data area detected as the hot spot is still the hot spot (therefore, information for controlling continuation of the caching). The cache capacity is a capacity of a cache memory that should be acquired for the caching.

For example, a segment with an ID "SA" belonging to a logical volume with an ID "A" is detected as a hot spot. In this case, as illustrated in FIG. 3C, a logical volume ID "A", a segment ID "SA", logic control "10 minutes", a cache capacity "256M (bytes)" are recorded in the information management table 42 as the hot spot together with time of detection of the hot spot.

The packet analyzing apparatus 4 instructs, based on the information management table 42, caching for the segment "SA" of the logical volume "A". In this cache instruction, cache capacity information (in the example of FIG. 3C, 256 megabytes) is notified to the storage server 10 corresponding to the segment based on the information management table 42.

The logic control can be empirically set according to a segment (or a logical volume), and is set in advance. The cache capacity is set in the same manner. When the segment ID is, for example, "SA", "predetermined detection time" is stored as the logic control, and "256M (byte)" is stored as a cache capacity. This detection time is, for example, 10 minutes. These values are stored in the packet analyzing apparatus 4 in advance.

When the segment ID is, for example, "SC", "not performed (not cached)" is stored as the logic control. Consequently, the user can select not to cache data.

After the caching, for cache control for the segment with the segment ID "SA", the packet analyzing apparatus 4 analyzes a concentration level of access in "10 minutes" after that based on the information accumulation table 41. The packet analyzing apparatus 4 determines, based on the analysis, whether the segment is still the hot spot. When the packet analyzing apparatus 4 determines that the segment is not the hot spot any more, the packet analyzing apparatus 4 notifies the storage server 10 corresponding to the segment of cache release. The storage server 10 which receives this notification requests the cache management server 2 to release the cache area.

In this way, the packet analyzing apparatus 4 continuously monitors, using the predetermined detection time corresponding to the segment regarded as the hot spot, whether the segment is the shot spot. Consequently, it is possible to prevent sudden access from being detected as a hot spot. Therefore, it is possible to prevent overhead due to caching, and hold down an increase in a network load.

The packet analyzing apparatus 4 monitors, at every predetermined monitoring time, based on the information accumulation table 41, a data area in which a concentration level of access to the storage 1 exceeds the first threshold. When the concentration level of access exceeds the first threshold, the packet analyzing apparatus 4 specifies a data area of the disk device 11 in which the concentration level of access exceeds the first threshold, and registers the specified data area in the information management table 42.

The packet analyzing apparatus 4 transmits, to the storage 1, a cache instruction for caching the data area in which the concentration level of access exceeds the first threshold to the cache server 5. Specifically, the packet analyzing apparatus 4 sends a cache instruction for the specified data area to the storage server 10 that manages the disk device 11 including the specified data area.

After data in the specified data area is cached to an assigned storage area (cache area) of the cache server 5, the packet analyzing apparatus 4 monitors, at the every predetermined monitoring time, based on the information accumulation table 41, whether the concentration level of access is below the second threshold after exceeding the first threshold. When the concentration level of access is below the second threshold, the packet analyzing apparatus 4 instructs the storage server 10 to release the caching (or release the cache area).

When the storage server 10 receives the cache instruction from the packet analyzing apparatus 4, the storage server 10 caches the specified data area in response to the cache instruction. For this purpose, the storage server 10 reads the specified data area (or data stored in the specified data area) from the disk device 11, and transfers the data area to the cache server 5.

Prior to this data transfer, when the storage server 10 receives the cache instruction, the storage server 10 requests, in response to the cache instruction, the cache management server 2 to assign a cache area. When the cache management server 2 receives the assigning request, the cache management server 2 assigns a storage area in the cache servers 5 in response to the assigning request. Thereafter, the cache management server 2 returns an acknowledgement of the assigning request to the storage server 10 at the transmission source. When the storage server 10 receives the acknowledgement of the assigning request, the storage server 10 transfers, in response to the acknowledgement, the data in the specified data area to the assigned cache area of the cache server 5. After this data transfer, the storage server 10 stores setting of cache control and address information of the cache server 5 at a cache destination in the data storage information of the disk device 11.

In input and output accesses from the access apparatus 3, the storage server 10 checks whether there is a cache hit based on the data area information. When there is a cache hit, the storage server 10 returns a response to the access apparatus 3 instructing the access apparatus 3 to access the cache server 5. When there is no cache hit, the storage server 10 reads the data from a data area corresponding to the access in the disk device 11, and, after performing the assigning request for a cache area, the data transfer, and the update of the data area information, returns a response to the access apparatus 3 instructing the access apparatus 3 to access the cache server 5.

When the cache management server 2 receives the assigning request for a cache area from the storage server 10, the cache management server 2 assigns a cache area in response to the assigning request, and manages the cache area. The cache management server 2 instructs the cache server 5, to which the cache area is assigned, to receive the data from the storage server 10 and write the data in the cache area. At the same time, when the assigning of the cache area is set, the cache management server 2 notifies the storage server 10 of completion of the assigning of the cache area.

When the cache management server 2 receives an releasing request for a cache area from the storage server 10, in response to the releasing request, the cache management server 2 instructs the cache server 5 to release the cache area. At the same time, the cache management server 2 instructs the cache server 5 to transfer data in the cache area to the storage server 10.

When the cache server 5 receives the assigning instruction of a cache area from the cache management server 2, the cache server 5 acquires, in response to the assigning instruction, the instructed cache area on the cache 51. Thereafter, the cache server 5 receives data of the specified data area from the storage server 10.

When there is a cache hit in the input and output accesses from the access apparatus 3, the cache server 5 performs data transfer to the access apparatus 3. When there is no cache hit, the cache server 5 performs data transfer to the access apparatus 3 after caching the data from the disk device 11 onto the cache 51.

Processing for detecting a hot spot and control processing for assigning, releasing, and the like of a cache area in the distributed disk cache system illustrated in FIG. 1 are explained below with reference to FIGS. 4 to 7.

Figure 4:
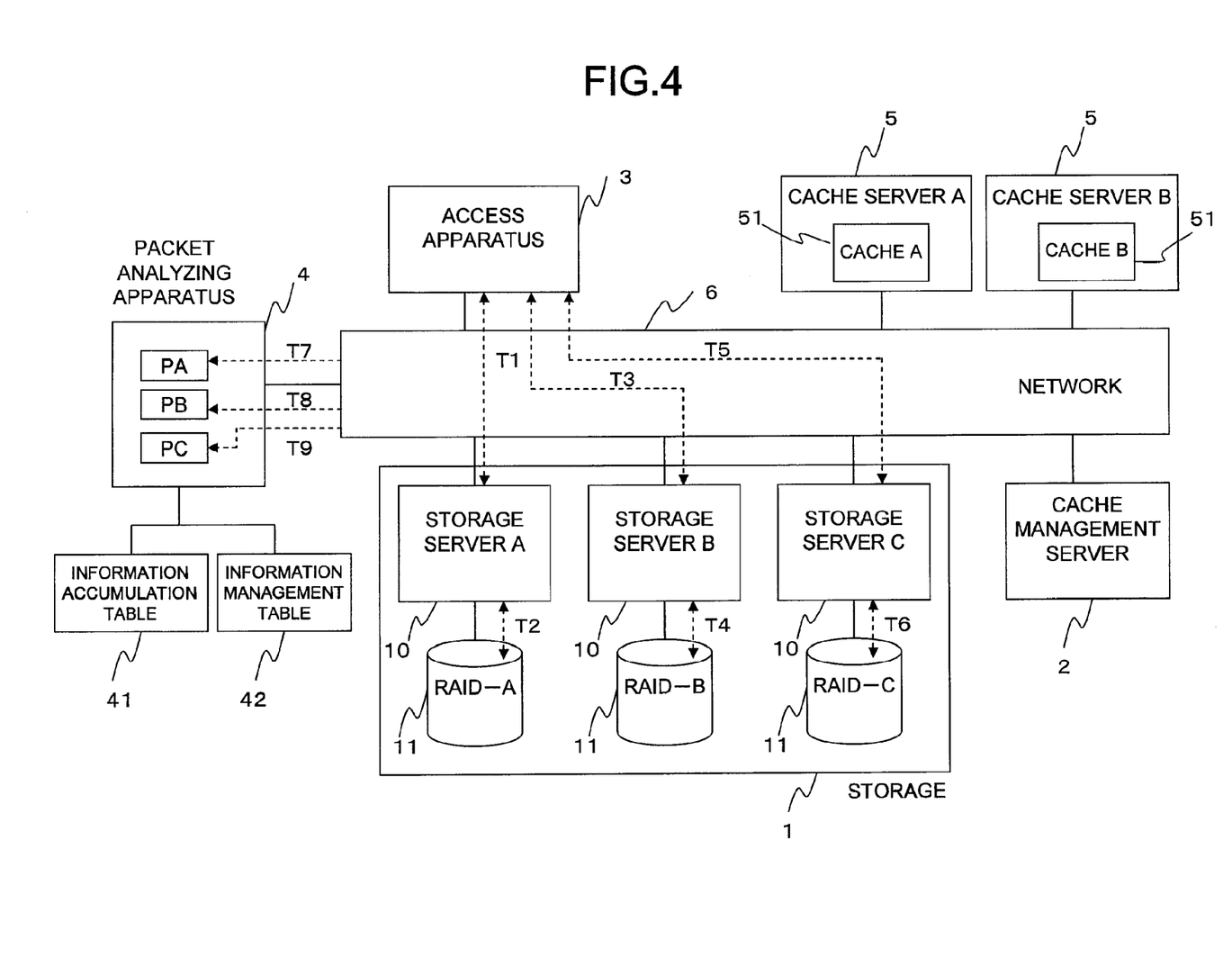
FIG. 4 is a diagram of an overview of an operation for monitoring an input and output packet by a packet analyzing apparatus.

FIG. 4 is a diagram of processing for monitoring an input and output packet of the access apparatus 3 by the packet analyzing apparatus 4.

When the application A of the access apparatus 3A is started, the application A sends a data read request or data write request to the storage server 10A via the network 6 (T1). The storage server 10A which receives this request performs the data read or data write to the disk device 11A corresponding thereto (T2).

Similarly, an application B of a started access apparatus 3B sends a data read request or data write request to a storage server 10B (T3). The storage server 10B performs the data read or data write to a disk device 11B (T4). An application C of an access apparatus 3C sends a data read request or data write request to a storage server 10C (T5). The storage server 10C performs the data read or data write to a disk device 11C (T6).

In parallel to such access processing, the packet analyzing apparatus 4 acquires, by performing packet monitoring via the network 6, a packet (a monitor packet concerning the access apparatus 3A) PA same as the packet transmitted and received by the access apparatus 3A in T1 (T7), and analyzes contents of the packet PA. Similarly, the packet analyzing apparatus 4 acquires a monitor packet PB concerning the access apparatus 3B (T8), acquires a monitor packet PC concerning the access apparatus 3C (T9), and analyzes contents of the monitor packets PB and PC.

The packet analyzing apparatus 4 performs statistical processing to a result of the analysis, and stores statistical information as a result of the statistical processing in the information accumulation table 41. Consequently, the information accumulation table 41 is created or sequentially updated.

Figure 5:
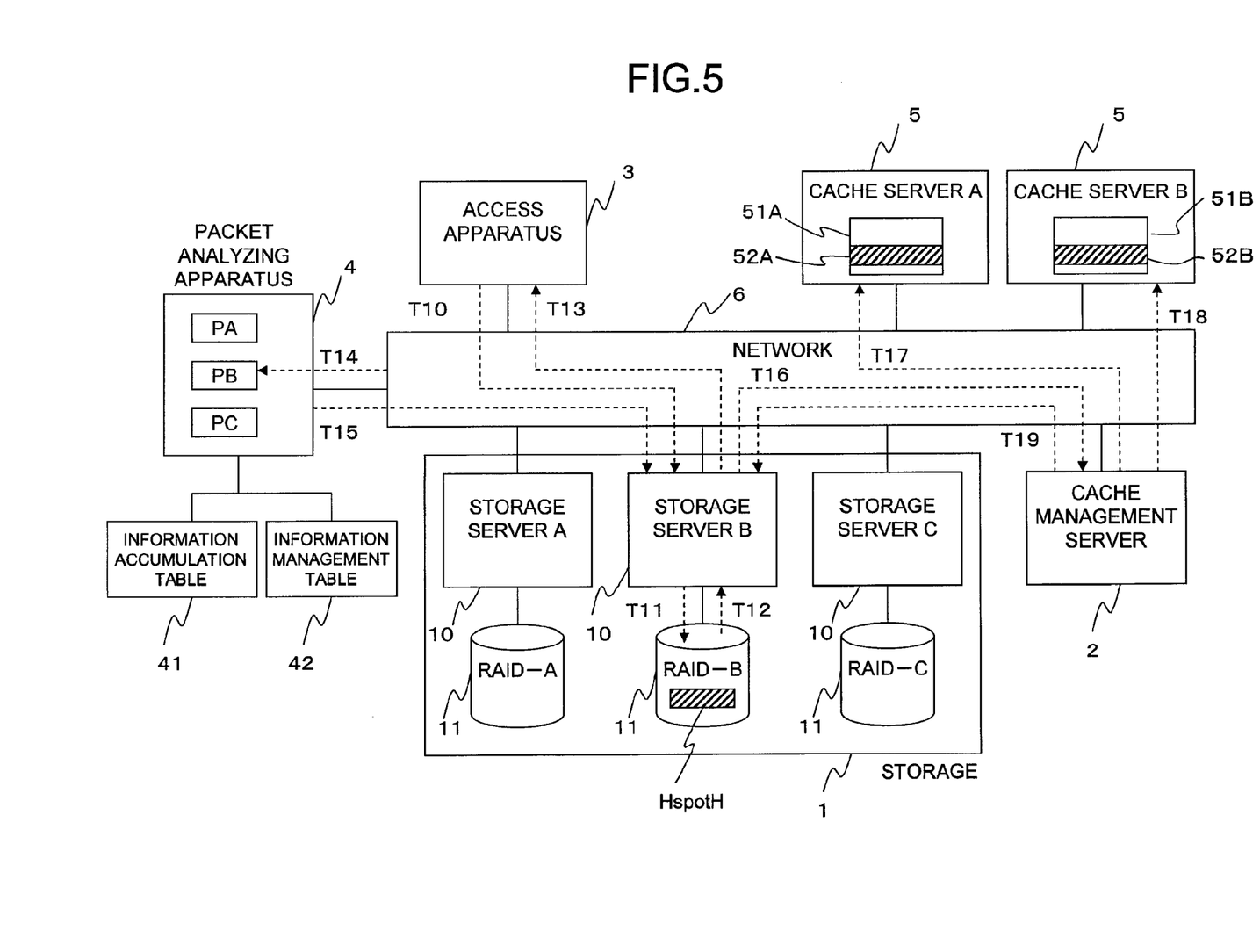
FIG. 5 is a diagram of an overview of operations of hot spot detection and cache control by the packet analyzing apparatus.

FIG. 5 is a diagram of an overview of operations of hot spot detection and cache control. In FIG. 5, the packet analyzing apparatus 4 detects a hot spot in access to the disk device 11 of the storage server 10, and performs the cache instruction.

For example, when the application B of the access apparatus 3B is started, the application B frequently accesses the disk device 11B as a volume B (a RAID-B). For example, the application B requests the storage server 10B to write data present therein (T10), and the storage server 10B writes the data in the disk device 11B (T11). When the application B requests the storage server 10B to read the data, the storage server 10B reads the data from the disk device 11B (T12), and transmits the read data to the application B of the access apparatus 3 (T13). Since these accesses concentrate on a specific slice of the storage server 10B, the slice is a hot spot H.

The packet analyzing apparatus 4 acquires and analyzes the monitor packet PB concerning the access apparatus 3B, stores statistical information as a result of the analysis in the information accumulation table 41, and sequentially updates the information accumulation table 41. The packet analyzing apparatus 4 detects, based on the information accumulation table 41, that a concentration level of access to the slice exceeds the first threshold, and detects the slice as the hot spot H (T14). The hot spot H is, for example, a hot spot in the pattern B illustrated in FIG. 11. The packet analyzing apparatus 4 registers the detected hot spot H in the information management table 42 together with predetermined information, detects the storage server 10B that manages the hot spot H. And, the packet analyzing apparatus 4 transmits a cache instruction and a size of a cache area, which is based on the slice detected as the hot spot H in T14, to the detected storage server 10B (T15).

The storage server 10B which receives the cache instruction transmits an assigning request for a cache area in the cache server 5 to the cache management server 2 together with the size of the cache area (T16).

The cache management server 2 which receives this assigning request transmits an assigning instruction for a cache area to the cache server 5A together with the size of the cache area (T17), and transmits an assigning instruction for a cache area to the cache server 5B together with the size of the cache area (T18).

For example, the cache server 5A which receives this assigning instruction acquires a cache area 52A having the assigning-instructed size on the cache 51A, and notifies the cache management server 2 of the cache area 52A together with an address (cache area information) thereof. The cache server 5B performs the same processing. Thereafter, the cache management server 2 notifies the storage server 10B that the cache areas 52A and 52B are acquired (T19). At this point, together with the cache area 52A, an IP address of the cache server 5A to which the cache area 52A belongs and the cache area information in the cache server 5A are also notified. The same processing is performed for the cache area 52B.

Figure 6:
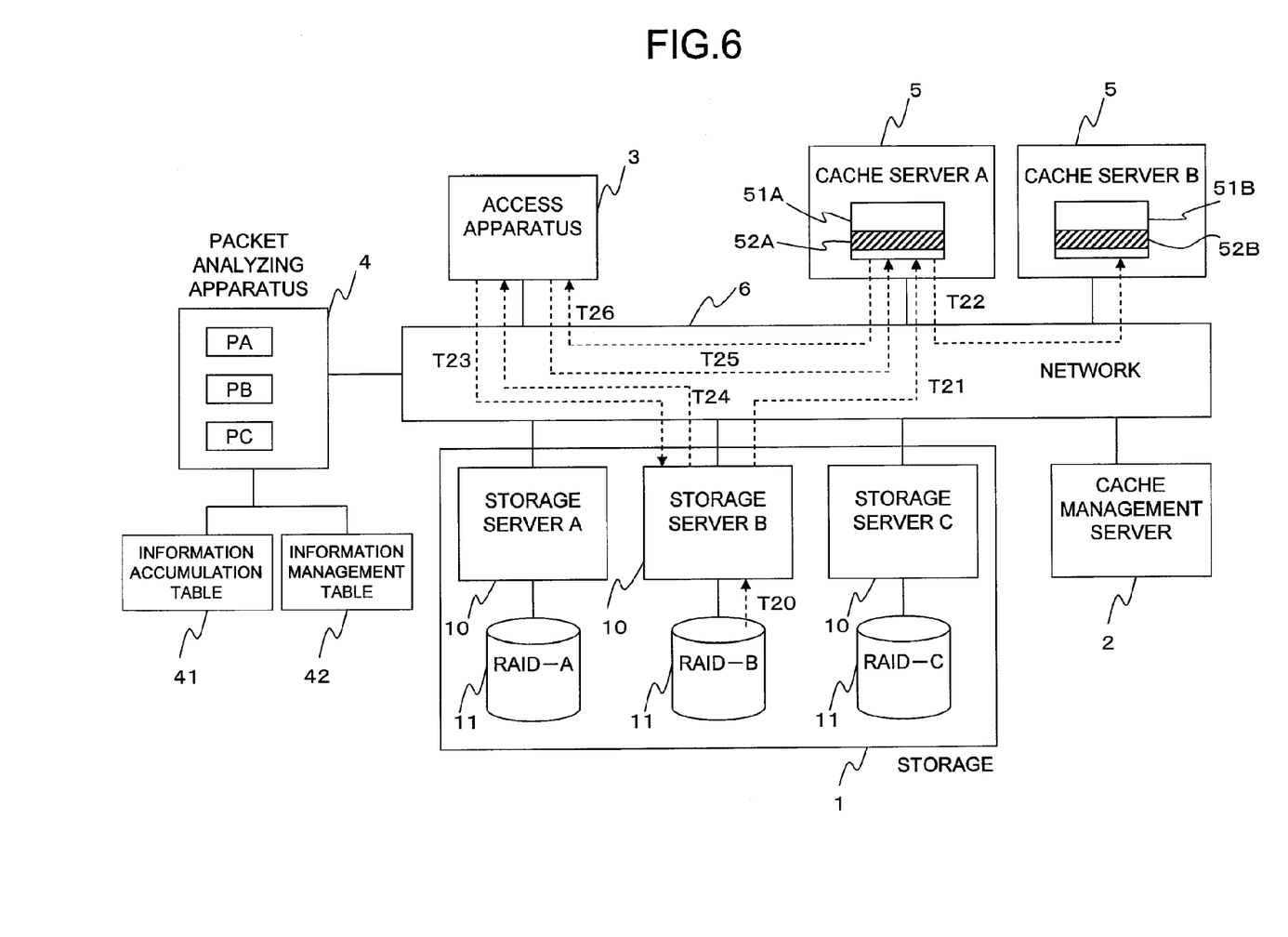
FIG. 6 is a diagram of an overview of an operation of I/O access processing after assigning of cache areas of cache servers.

FIG. 6 is an overview of an operation of I/O access processing after assigning of a cache area of the cache server 5.

The storage server 10B, which receives the notification of acquiring of the cache area, reads data of the slice of the disk device 11B detected as the hot spot H for caching (T20). Thereafter, the storage server 10B transfers the read data to the cache server 5A as the primary disk (T21). Further, the storage server 10B writes, in the slice x meta-information (see FIG. 3A) of the disk device 11B corresponding thereto, validity of caching (information indicating that the slice is cached), the IP address and the cache area information of the cache server 5A, and an IP address and cache area information of the cache server 5B. The IP addresses and the cache area information of the cache servers 5A and 5B are received together with the notification of the acquiring of the cache area.

When the cache server 5A receives the transferred data, the cache server 5A writes the data in the cache area 52A. Thereafter, the cache server 5A transfers the data written in the cache area 52A to the cache server 5B as the secondary disk (T22). When the cache server 5B receives the transferred data, the cache server 5B writes the data in the cache area 52B. Consequently, the data of the hot spot H is cached and mirrored.

Thereafter, the access apparatus 3 transmits an I/O request to the storage server 10B (T23). The storage server 10B performs processing explained below in response to the I/O request.

When access processing is the read processing, the storage server 10B reads, from a slice that should be read, the slice meta-information 113 of the slice, and checks whether caching is valid for the slice based on the slice meta-information 113. When the caching is valid, the storage server 10B returns a response to the access apparatus 3 instructing the access apparatus 3 to read the data from the cache server 5A (T24).

When the caching is invalid, the storage server 10B transfers the data of the slice to the cache server 5A (hereinafter referred to as "cache transfer"). Thereafter, the storage server 10B writes in the slice meta-information 113 of the slice that the caching is valid. Thereafter, the storage server 10B responds to the access apparatus 3 instructing the access apparatus 3 to read the data from the cache server 5A (same timing as T24).

On the other hand, when access processing is write processing, the storage server 10B reads, from a slice that should be written, the slice meta-information 113 of the slice and checks whether caching is valid for the slice based on the slice meta-information 113. When the caching is valid, the storage server 10B returns a response to the access apparatus 3 instructing the access apparatus 3 to write the data in the cache server 5A (same timing as T24).

When the caching is invalid, the storage server 10B cache-transfers the data of the slice to the cache server 5A. Thereafter, the storage server 10B writes in the slice meta-information 113 of the slice that the caching is valid. Thereafter, the storage server 10B responds to the access apparatus 3 instructing the access apparatus 3 to write the data in the cache server 5A (same timing as T24).

The access apparatus 3 which receives the notification switches an access destination of the access from the disk device 11B to the cache server 5A (T25). The access apparatus 3 transmits the I/O request to the cache server 5A, and reads or writes the data (T26).

Thereafter, the read data read or written data in the cache server 5A is mirrored to the cache server 5B. This mirroring is executed, for example, when the data read or data write is finished. The mirroring may be performed, for example, at a fixed time interval or may be performed when the number of times of the data read and data write exceeds the number of times set in advance.

Figure 7:
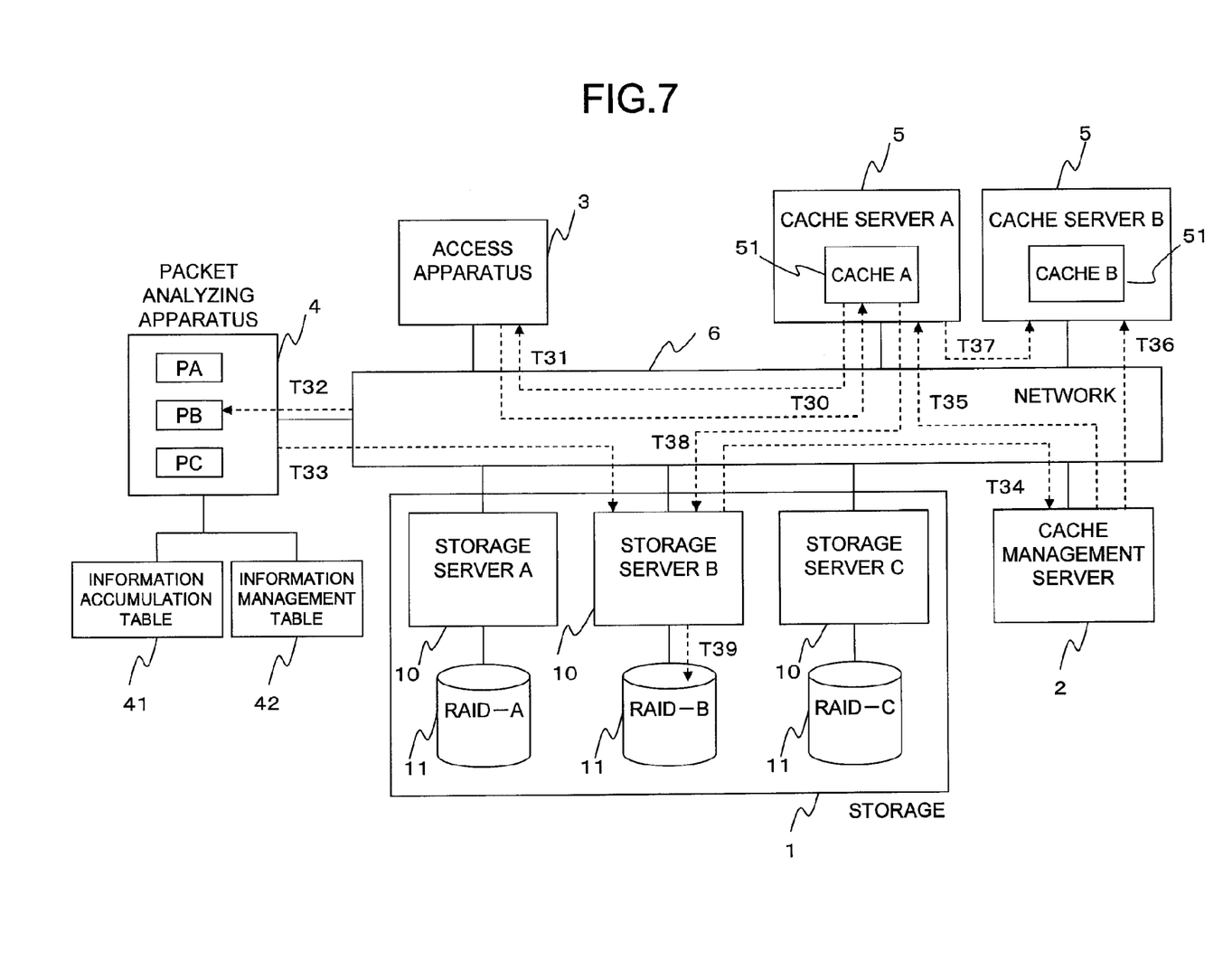
FIG. 7 is a diagram of an overview of an operation after releasing of the cache areas of the cache servers.

FIG. 7 is a diagram of processing for releasing a cache area of the cache server 5.

I/O access to the hot spot H cached in the cache server 5 is executed between the access apparatus 3 and the cache server 5A (T30 and T31). For example, this access is extremely frequently executed at first but suddenly decreases thereafter.

The packet analyzing apparatus 4 detects, based on the information accumulation table 41, that a concentration level of access to the slice is below the second threshold, and detects that the slice is not a hot spot (T32). This detection processing is executed at every predetermined unit time in logic control registered in the information management table 42.

Therefore, the packet analyzing apparatus 4 notifies the storage server 10B of release of the caching of the slice as the hot spot H (T33). The storage server 10B which receives the release of the caching notifies the cache management server 2 of the release of the caching (T34). The cache management server 2 which receives the release of the caching notifies the cache server 5A of the release of the caching (T35), and notifies the cache server 5B of the same (T36).

Thereafter, the cache server 5A stores cache data as contents of the cache area 52A (see FIG. 6) in the cache area 52B (see FIG. 6) of the cache server 5B (T37). The processing in T37 may be omitted. Thereafter, the cache server 5A transfers the contents of the cache area 52A to the storage server 10B (T38). The storage server 10B which receives the contents of the cache area 52A writes the received data in a slice corresponding thereto of the disk device 11B (T39).

Thereafter, the disk device 11B writes in the slice meta-information 113 corresponding to the slice of the data area 110 that caching for the slice is invalid, and notifies the storage server 10B of the end of this writing. The storage server 10B which receives the end of the writing notifies the cache server 5A of completion of the writing of the contents of the cache area 52A in the disk device 11B.

The cache server 5A which receives this completion notification notifies the cache server 5B of releasing of the cache area 52B. The cache server 5B, which receives the notification of the releasing, releases the cache area 52B. Thereafter, the cache server 5B notifies the cache server 5A of completion of the releasing of the cache area 52B. The cache server 5A which receives the notification releases the cache area 52A. Thereafter, the cache server 5A notifies the cache management server 2 of completion of the releasing of the cache areas 52A and 52B.

Thereafter, for example, the cache management server 2 notifies the packet analyzing apparatus 4 of the completion of the releasing of the cache areas 52A and 52B. According to the notification, the packet analyzing apparatus 4 deletes the hot spot H from the information management table 42.

Figure 8:
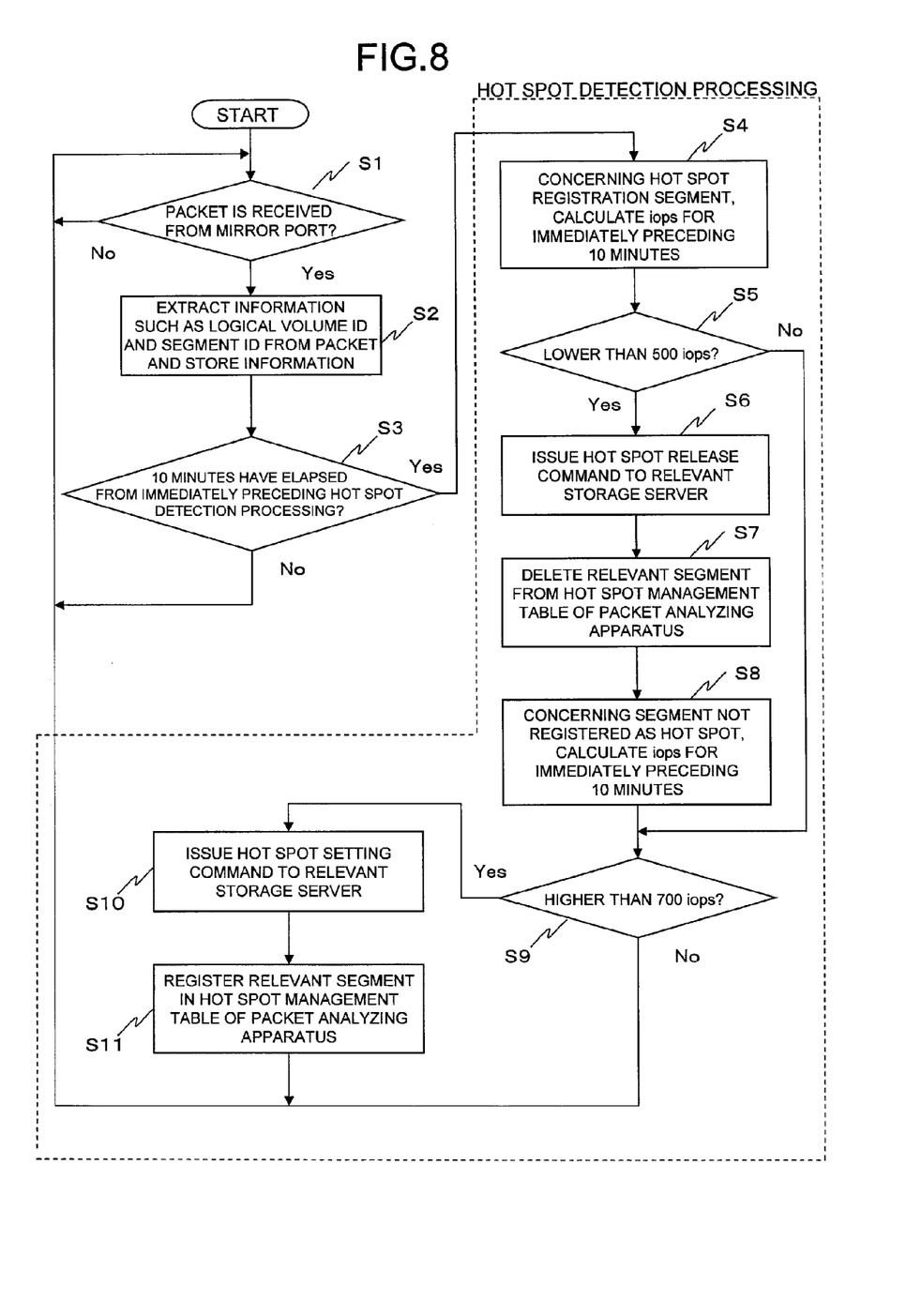
FIG. 8 is a flowchart of a hot spot determination processing flow of the packet analyzing apparatus.

FIG. 8 is a flowchart of a hot spot determination processing flow of the packet analyzing apparatus 4.

The packet analyzing apparatus 4 waits for, in the network switch or the like included in the network 6, a packet received from a mirror port of a communication interface with the access apparatus 3 (step S1). When a packet is not received (step S1, No), the packet analyzing apparatus 4 repeats the step S1.

When a packet is received (step S1, Yes), the packet analyzing apparatus 4 analyzes an acquired monitor packet, reads information such as information concerning an access destination such as a logical volume ID and a segment ID, an access type of read processing or write processing, and a packet size, and stores the information in the information accumulation table 41 (step S2).

The packet analyzing apparatus 4 monitors whether a predetermined detection time concerning the segment (or the logical volume) has passed from detection of an immediately preceding hot spot (or from processing in the steps S4 to S11) (step S3). When the segment ID is "SA", the predetermined detection time is 10 minutes. When the predetermined detection time has not passed (step S3, No), the packet analyzing apparatus 4 repeats the step S1. When the segment is not registered in the information management table 42, it is assumed that the predetermined detection time has not passed. When the predetermined detection time has passed (step S3, Yes), the packet analyzing apparatus 4 reads, concerning a segment registered in the information management table 42 (hereinafter referred to as "hot spot registered segment"), recorded inputs and outputs of the hot spot registered segment from the information accumulation table 41 by using its segment ID in the predetermined detection time, or immediately preceding 10 minutes, and calculates a number of input and output packets "iops" (step S4).

The packet analyzing apparatus 4 checks whether the value "iops" in the immediately preceding predetermined detection time, i.e., 10 minutes is smaller than 500 (in FIG. 8, represented as 500 iops) (step S5). The second threshold in this example is 500 iops. When the value "iops" is not smaller than 500 (step S5, No), the packet analyzing apparatus 4 executes step S9. When the value "iops" is smaller than 500 (step S5, Yes), the packet analyzing apparatus 4 instructs the storage server 10, which manages a segment having the value "iops" smaller than 500, to release the hot spot H (step S6). In other words, the packet analyzing apparatus 4 notifies the storage server 10 of release of caching.

The packet analyzing apparatus 4 deletes a relevant segment from the information management table 42 (hereinafter referred to as "hot spot management table") (step S7). The packet analyzing apparatus 4 calculates the value "iops" in immediately preceding 10 minutes concerning a slice, i.e., a segment not registered in the hot spot management table as a hot spot (hereinafter referred to as "unregistered segment") (step S8).

The packet analyzing apparatus 4 checks whether the value "iops" in immediately preceding 10 minutes is larger than 700 (step S9). The first threshold in this example is 700 iops. When the value "iops" is not larger than 700 (step S9, No), the packet analyzing apparatus 4 repeats the step S1.

When the value "iops" is larger than 700 (step S9, Yes), the packet analyzing apparatus 4 instructs the storage server 10, which manages a segment having the value "iops" larger than 700, to set a hot spot (step S1). In other words, the packet analyzing apparatus 4 notifies a caching instruction. After acknowledgement of the storage server 10, the packet analyzing apparatus 4 registers a relevant segment in the hot spot management table (step S11), and repeats the step S1.

When the first threshold is set larger than the second threshold, it is possible to surely register a data area determined as a hot spot in the hot spot management table. It is also possible to continue caching of a data area once detected as a hot spot. Consequently, it is possible to prevent occurrence of overhead.

Figure 9:
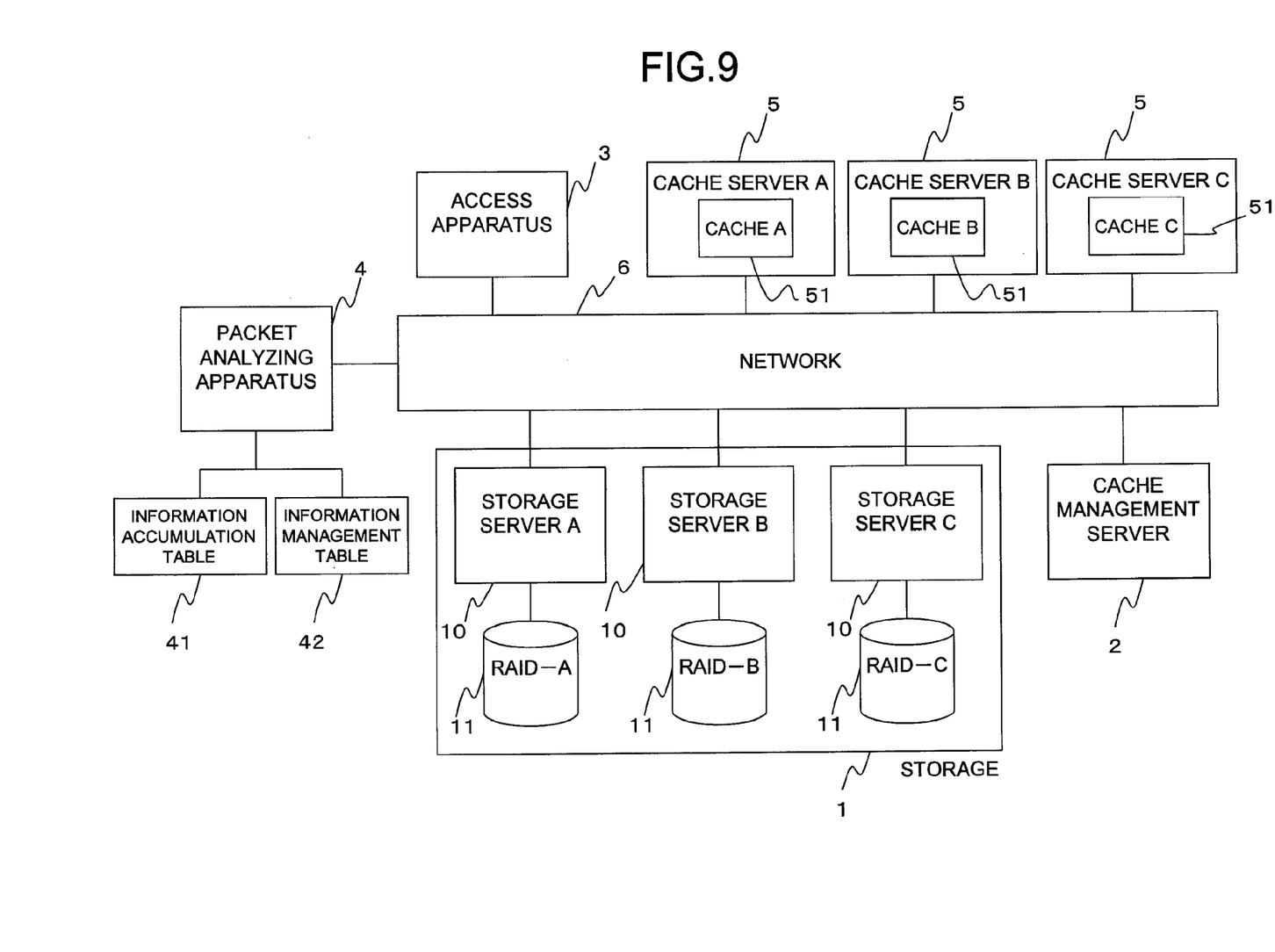
FIG. 9 is a diagram of a structure of a distributed disk cache system according to another embodiment of the present invention.

FIG. 9 is a diagram of a structure of a distributed disk cache system according to another embodiment of the present invention. In FIG. 9, a cache server 5C is added to the structure illustrated in FIG. 1. In the distributed disk cache system illustrated in FIG. 9, the cache server 5 can be easily added to the network 6 depending on the disk capacity of the storage 1 and the I/O load of the access apparatus 3. In the distributed disk cache system illustrated in FIG. 9, one packet analyzing apparatus 4 is provided. However, a plurality of packet analyzing apparatuses 4 may be connected to the network 6 according to the number of access apparatuses 3, the number of monitored communication ports, and the like.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the sprit and scope of the invention.

What is claimed is:

1. A distributed disk cache system comprising:
   a storage divided into a plurality of data areas;
   a cache server caching one or a plurality of data areas of the storage;
   an access apparatus accessing the storage or the cache server via a network;
   a monitoring apparatus connected to the network, monitoring access from the access apparatus to the storage via the network, and caching a data area to the cache server, the data area having a concentration level of the access exceeding a first threshold;
   an information management table storing a control information for controlling continuation of the caching of the data area cached to the cache server, the control information being set for each data area; and
   an information accumulation table storing statistical information of the data area cached to the cache server, the statistical information generated by statistically processing a result of monitoring the access from the access apparatus to the storage,
   wherein the monitoring apparatus stores a control information of a data area cached to the cache server in the information management table when the data area is cached to the cache server, updates statistical information of the data area cached to the cache server in the information accumulation table at a time interval of the control information of the data area cached to the cache server, and monitors whether the concentration level of the access to the storage exceeds the first threshold and whether the concentration level of the access to the cached data area is below a second threshold based on the updated statistical information of the data area cached to the cache server.

2. The distributed disk cache system according to claim 1, wherein the monitoring apparatus monitors access from the access apparatus to the cache server via the network, and, when a concentration level of access to the cached data area is below the second threshold, releases caching of the cached data area to the cache server.

3. The distributed disk cache system according to claim 1, further comprising:
- a cache management server managing the cache server, wherein:
- the monitoring apparatus transmits to the storage a cache instruction instructing to cache the data area to the cache server, the data area having the concentration level of the access exceeding the first threshold;
- the storage requests the cache management server to assign a cache area in response to the cache instruction;
- the cache management server assigns a storage area in the cache server in response to the request; and
- the storage caches the data area to the assigned storage area, the data area having the concentration level of the access exceeding the first threshold.

4. A distributed disk cache method in a distributed disk cache system including: a storage divided into a plurality of data areas; a cache server caching one or a plurality of data areas of the storage; an access apparatus accessing the storage or the cache server via a network; and a monitoring apparatus connected to the network, the method comprising:
- monitoring, in the monitoring apparatus, access from the access apparatus to the storage via the network;
- caching, in the monitoring apparatus, a data area to the cache server, the data area having the concentration level of the access exceeding the first threshold;
- storing control information for controlling continuation of the caching of the data area cached to the cache server in an information management table, the control information being set for each data area; and
- storing statistical information of the data area cached to the cache server in an information accumulation table, the statistical information generated by statistically processing a result of monitoring the access from the access apparatus to the storage,
- wherein the monitoring stores a control information of a data area cached to the cache server in the information management table when the data area is cached to the cache server, updates statistical information of the data area cached to the cache server in the information accumulation table at a time interval of the control information of the data area cached to the cache server, and monitors whether the concentration level of the access to the storage exceeds the first threshold and whether the concentration level of the access to the cached data area is below a second threshold based on the updated statistical information of the data area cached to the cache server.

* * * * *